(12) United States Patent
Shojaku (10) Patent No.: US 9,992,376 B2
(45) Date of Patent: Jun. 5, 2018

(54) IMAGE FORMING APPARATUS

(71) Applicant: Konica Minolta, Inc., Chiyoda-ku, Tokyo (JP)

(72) Inventor: Hiroki Shojaku, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/414,951

(22) Filed: Jan. 25, 2017

(65) Prior Publication Data
US 2017/0223229 A1 Aug. 3, 2017

(30) Foreign Application Priority Data

Jan. 28, 2016 (JP) .................................. 2016-014644

(51) Int. Cl.
| | |
|---|---|
| H04N 1/60 | (2006.01) |
| H04N 1/46 | (2006.01) |
| H04N 1/407 | (2006.01) |
| H04N 1/00 | (2006.01) |
| H04N 1/40 | (2006.01) |

(52) U.S. Cl.
CPC ....... *H04N 1/4072* (2013.01); *H04N 1/00023* (2013.01); *H04N 1/00042* (2013.01); *H04N 1/00087* (2013.01); *H04N 1/40062* (2013.01); *H04N 1/6008* (2013.01); *H04N 1/6044* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 5,187,570 | A * | 2/1993 | Hibi | H04N 1/40012 358/515 |
| 8,861,025 | B2 * | 10/2014 | Hoshino | H04N 1/603 358/1.9 |
| 9,894,248 | B2 * | 2/2018 | Hirano | H04N 1/6019 |
| 9,900,472 | B2 * | 2/2018 | Horita | H04N 1/6019 |
| 2002/0126143 | A1 * | 9/2002 | Bae | G06F 3/0485 715/723 |
| 2002/0158933 | A1 * | 10/2002 | Yamamoto | H04N 1/52 347/15 |

(Continued)

FOREIGN PATENT DOCUMENTS

JP 2014-182353 A 9/2014

*Primary Examiner* — Madelein Nguyen
(74) *Attorney, Agent, or Firm* — Buchanan Ingersoll & Rooney PC (57) ABSTRACT

An image forming apparatus includes: a raster image processing unit configured to convert original image data into image data for image formation being of a raster image; an image forming unit configured to form an image on a paper sheet; a reading unit configured to generate read image data by reading the image formed on the paper sheet; a monitor setting unit configured to set a monitor setting color and an ideal value for the monitor setting color; a color tone monitoring unit configured to monitor a color tone difference between a value of the read image data in the monitor setting color and the ideal value; and a hardware processor configured to perform control to have color correction performed in the image forming unit, wherein the monitor setting color includes at least one of a primary color, a secondary color, a tertiary color, and a tertiary achromatic color.

17 Claims, 5 Drawing Sheets

(56) References Cited

U.S. PATENT DOCUMENTS

| | | | | |
|---|---|---|---|---|
| 2002/0175932 | A1* | 11/2002 | Yu | G06F 17/30796 |
| | | | | 715/720 |
| 2004/0118920 | A1* | 6/2004 | He | G06K 7/0004 |
| | | | | 235/454 |
| 2005/0168762 | A1* | 8/2005 | Tsuchiya | H04N 1/54 |
| | | | | 358/1.9 |
| 2006/0170996 | A1* | 8/2006 | Headley | B41F 33/0045 |
| | | | | 358/518 |
| 2007/0229574 | A1* | 10/2007 | Kaneko | B41J 2/17566 |
| | | | | 347/19 |
| 2010/0079524 | A1* | 4/2010 | Saita | B41J 2/2114 |
| | | | | 347/14 |
| 2010/0098333 | A1* | 4/2010 | Aoyagi | H04N 1/64 |
| | | | | 382/166 |
| 2010/0296730 | A1* | 11/2010 | Matsuoka | H04N 1/4092 |
| | | | | 382/166 |
| 2012/0321327 | A1* | 12/2012 | Umeda | G03G 15/5062 |
| | | | | 399/15 |
| 2013/0235430 | A1* | 9/2013 | Sakatani | G06K 15/129 |
| | | | | 358/3.23 |
| 2013/0250317 | A1* | 9/2013 | Kubo | H04N 1/52 |
| | | | | 358/1.9 |
| 2013/0250322 | A1* | 9/2013 | Kawabata | H04N 1/60 |
| | | | | 358/1.9 |
| 2015/0220819 | A1* | 8/2015 | Yamamoto | G06K 15/027 |
| | | | | 358/1.9 |
| 2017/0013166 | A1* | 1/2017 | Katsuyama | H04N 1/4052 |
| 2017/0193545 | A1* | 7/2017 | Zhou | G06Q 30/0243 |
| 2017/0201652 | A1* | 7/2017 | Hirano | G06K 15/1836 |
| 2017/0251128 | A1* | 8/2017 | Horita | H04N 1/6019 |
| 2017/0280022 | A1* | 9/2017 | Kuroiwa | G06K 15/027 |

* cited by examiner

IMAGE FORMING APPARATUS

The entire disclosure of Japanese Patent Application No. 2016-014644 filed on Jan. 28, 2016 including description, claims, drawings, and abstract are incorporated herein by reference in its entirety.

BACKGROUND OF THE INVENTION

Field of the Invention

The present invention relates to an image forming apparatus that monitors the color tone in image formation.

Description of the Related Art

There is an image forming apparatus that reads images formed on paper sheets. In this image forming apparatus, a reading unit formed with an in-line sensor or the like is connected to the downstream side of the image forming unit that forms images on paper sheets. There also is an image forming system that reads images formed on paper sheets with a reading device (a printout reading device) connected to the latter stage of an image forming apparatus that forms images on paper sheets.

In such an image forming apparatus and an image forming system, a predetermined patch image (a correction image) is formed on a paper sheet on a regular basis, and the patch image on the paper sheet is read. Consequently, any color change (color tone difference) in the image forming apparatus can be sensed and corrected (calibrated).

However, due to this patch image formation on paper sheets, extra paper sheets for the patch image formation are consumed. Further, due to the output of the paper sheets having the patch image formed thereon, the productivity in regular image formation becomes lower.

To counter these problems, a technique has been suggested to reduce such extra paper sheet consumption and the decrease in productivity. According to this technique, image data for image formation is compared with printout read image data pixel by pixel. As this technique does not involve patch image formation on paper sheets, the extra paper sheet consumption and the decrease in productivity are supposedly reduced.

JP 2014-182353 A suggests various techniques related to this kind of technology.

For an image forming apparatus that forms toner images by an electrophotographic method, a patchless color correction technique that does not require any special chart and does not generate any spoiled paper (or minimizes spoiled paper) has been suggested to maintain color reproduction stability when a color change (a color tone difference) occurs due to various factors. According to this technique, original image data is compared with read image data of a printed material, and color reproduction is analyzed so that the result of the analysis can be used in color correction. However, if the data necessary for calibration cannot be obtained from the original image data that is normally used, or if the amount of data is too small, calibration cannot be performed.

JP 2014-182353 A also discloses a method of monitoring the color change (color tone difference) between output images on different pages or between the same pages of two or more copies. However, according to JP 2014-182353 A, the monitoring cannot be performed unless there is a flat region with a certain width. Further, only changes in the colors in the monitor target regions can be monitored, and the method is compatible only with the colors that satisfy certain conditions.

SUMMARY OF THE INVENTION

An object of the present invention is to provide an image forming apparatus that is not affected by a shortage of the data to be monitored or the like, and can monitor a color tone difference without the use of a color patch or the like.

That is, the present inventions for solving the above problems are as follows.

(1) To achieve the abovementioned object, according to an aspect, an image forming apparatus reflecting one aspect of the present invention comprises: a raster image processing unit configured to convert original image data into image data for image formation, the original image data being of an image other than a raster image, the image data for image formation being of a raster image; an image forming unit configured to form an image on a paper sheet in accordance with the image data for image formation; a reading unit configured to generate read image data by reading the image formed on the paper sheet by the image forming unit; a monitor setting unit configured to set a monitor setting color and an ideal value for the monitor setting color, the monitor setting color being used for monitoring a color tone difference at corresponding positions in the image data for image formation and the read image data; a color tone monitoring unit configured to monitor a color tone difference between a value of the read image data in the monitor setting color and the ideal value at the corresponding positions in the image data for image formation and the read image data; and a hardware processor configured to perform control to have color correction performed in the image forming unit when the color tone difference is equal to or larger than a predetermined threshold value in the color tone monitoring unit, wherein the monitor setting color includes at least one of a primary color among primary colors of color materials to be used in image formation, a secondary color generated by combining two of the primary colors, a tertiary color generated by combining three chromatic colors among the primary colors at a predetermined ratio, and a tertiary achromatic color generated by combining three chromatic colors among the primary colors at a predetermined ratio.

(2) According to the above Item. 1, the color tone monitoring unit preferably performs color tone difference monitoring, using at least one of an absolute value of the color tone difference caused by temporal change and a degree of change in the color tone difference as a threshold value.

(3) According to the above Item. 1, the monitor setting unit preferably sets the monitor setting color in a low-spatial-frequency region not including text data.

(4) According to the above Item. 1, the monitor setting unit preferably selects the tertiary achromatic color as the monitor setting color.

(5) According to the above Item. 1, when the tertiary color is selected as the monitor setting color, the monitor setting unit preferably determines the tertiary color to be a color in a facial region recognized through a face recognition process.

(6) According to the above Item. 1, the monitor setting unit preferably sets a plurality of colors as the monitor setting colors.

(7) According to the above Item. 1, the monitor setting unit preferably sets the ideal value by converting the original image data as the monitor setting color in accordance with one of an ICC profile and a multi-dimensional LUT.

(8) According to the above Item. 1, the monitor setting unit preferably sets the ideal value in accordance with one of the read image data obtained by reading the image formed on the paper sheet by the image forming unit in accordance with the image data for image formation, and a mean value of a plurality of pieces of the read image data.

(9) According to the above Item. 1, the monitor setting unit preferably sets the threshold value in accordance with a setting state of the monitor setting color.

(10) According to the above Item. 1, the monitor setting unit preferably sets the threshold value in accordance with a type of the monitor setting color.

(11) According to the above Item. 1, the monitor setting unit preferably sets the monitor setting color by using a mean value of color extracted from a plurality of portions in the image.

(12) According to the above Item. 1, the color tone monitoring unit preferably monitors the color tone difference at a corresponding position in the read image data with respect to one setting of the monitor setting color.

(13) According to the above Item. 1, when the monitor setting unit sets a spot color as the monitor setting color, the spot color being other than colors of basic color materials to be used in image formation, the color tone monitoring unit preferably monitors the color tone difference with respect to the spot color in a region including only the spot color, the region not including other colors.

(14) According to the above Item. 1, even when the color tone difference does not reach the threshold value in the color tone monitoring unit, the hardware processor preferably performs control to have color correction performed in the image forming unit at regular time intervals or every time image formation is completed on a certain number of paper sheets.

(15) According to the above Item. 1, even when the monitor setting color does not appear, the hardware processor preferably performs control to have color correction performed in the image forming unit at regular time intervals or every time image formation is completed on a certain number of paper sheets.

(16) According to the above Item. 1, the hardware processor preferably performs the color correction by: forming a correction image in a margin of the paper sheet with the image forming unit; generating read correction image data by reading the correction image with the reading unit; and adjusting the image forming unit by using the read correction image data with the hardware processor.

(17) To achieve the abovementioned object, according to an aspect, a non-transitory recording medium storing a computer readable program reflecting one aspect of the present invention causes a computer to execute: a raster image processing step of converting original image data into image data for image formation, the original image data being of an image other than a raster image, the image data for image formation being of a raster image; an image forming step of forming an image on a paper sheet in accordance with the image data for image formation; a reading step of generating read image data by reading the image formed on the paper sheet in the image forming step; a monitor setting step of setting a monitor setting color and an ideal value for the monitor setting color, the monitor setting color being used for monitoring a color tone difference at corresponding positions in the image data for image formation and the read image data; a color tone monitoring step of monitoring a color tone difference between a value of the read image data in the monitor setting color and the ideal value at the corresponding positions in the image data for image formation and the read image data; and a step of performing color correction in the formed image when the color tone difference is equal to or larger than a predetermined threshold value in the color tone monitoring step, wherein the monitor setting color includes at least one of a primary color among primary colors of color materials to be used in image formation, a secondary color generated by combining two of the primary colors, a tertiary color generated by combining three chromatic colors among the primary colors at a predetermined ratio, and a tertiary achromatic color generated by combining three chromatic colors among the primary colors at a predetermined ratio.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of an image forming apparatus that is capable of analyzing color reproduction without any adverse influence of destabilizing factors and any use of a color patch or the like will be described in detail with reference to the drawings. However, the scope of the invention is not limited to the illustrated examples.

[Structure of an Image Forming Apparatus]

Figure 1:
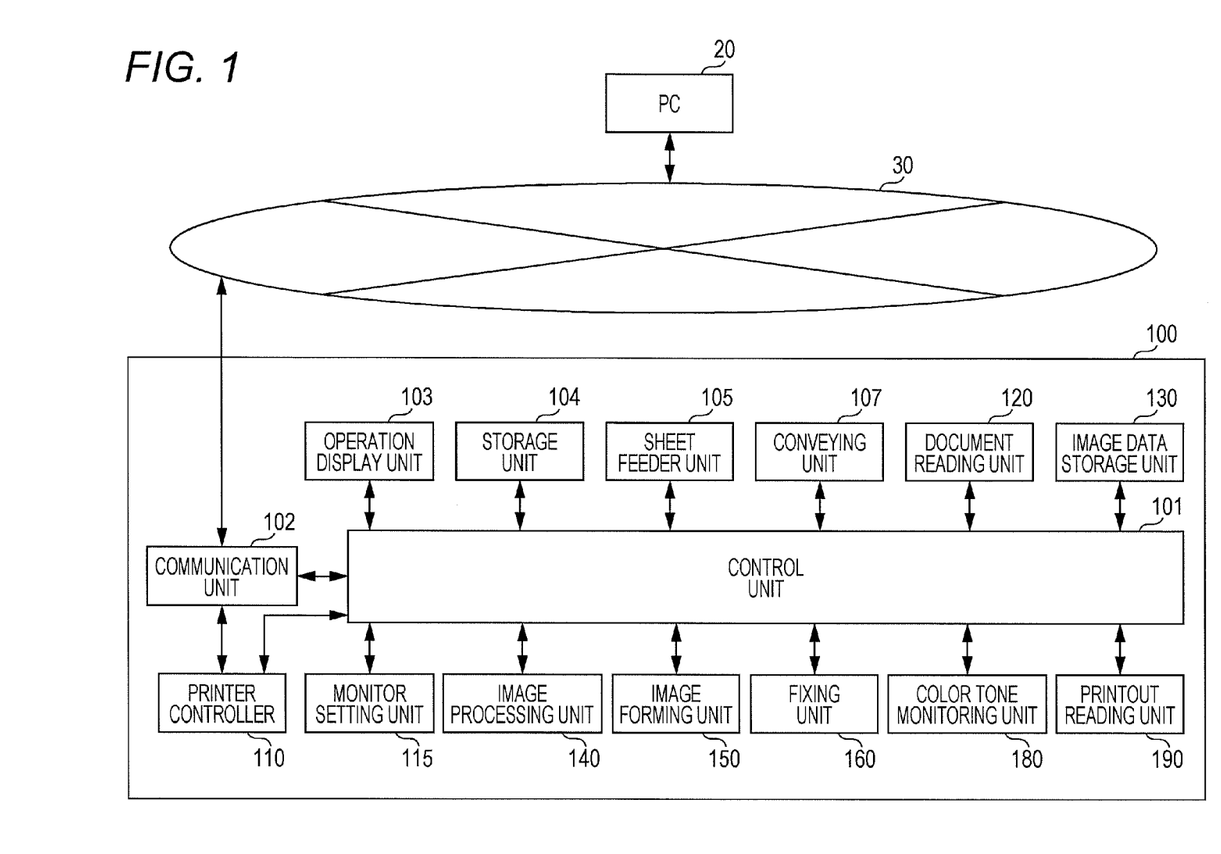
FIG. 1 is a diagram showing a configuration according to an embodiment of the present invention.
Figure 2:
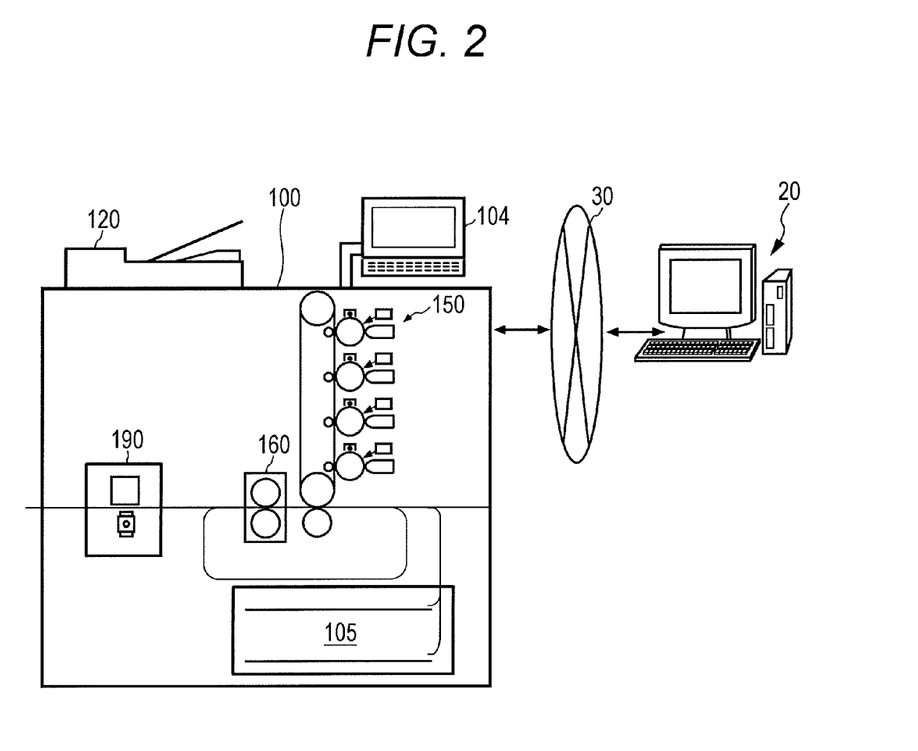
FIG. 2 is a diagram showing another configuration according to the embodiment of the present invention.

Referring now to FIGS. 1 and 2, an example structure of an image forming apparatus 100 is described in detail. FIG. 1 is a functional block diagram showing the functions of the respective components of the image forming apparatus 100. FIG. 2 is an explanatory diagram showing mechanical elements of the respective components of the image forming apparatus 100.

The image forming apparatus 100 is connected to a PC 20 as an information processing terminal via a network 30. The PC 20 creates original image data (print data of an image other than a raster image) written in PDL, and transmits the original image data to the image forming apparatus 100 via the network 30.

The image forming apparatus 100 includes: a control unit 101 that controls the respective components in the image forming apparatus 100; a communication unit 102 that communicates with another device connected thereto; an operation display unit 103 that displays an operation input by a user and the state of the image forming apparatus 100; a storage unit 104 that stores various settings; a sheet feeder unit 105 that can send paper sheets stored in a sheet feeder tray; a conveying unit 107 that conveys paper sheets in the apparatus; a printer controller 110 that performs RIP on original image data that is written in PDL and is transmitted from the PC 20, and turns the original image data into image data for image formation; a monitor setting unit 115 that sets a monitor setting color for monitoring the color tone difference at the corresponding positions in the image data for image formation and read image data in accordance with the original image data, and an ideal value of the monitor setting color; a document reading unit 120 that reads a document; an image data storage unit 130 that stores the image data to be used in image formation and various kinds of data; an image processing unit 140 that performs various kinds of image processing necessary for image formation; an image forming unit 150 that forms an image on a paper sheet in accordance with an image formation instruction and the image data; a fixing unit 160 that fixes a toner image formed on a paper sheet with heat and pressure; a color tone monitoring unit 180 that analyzes color reproduction by comparing the pixel value of the image data for image formation with the pixel value of the read image data; and a printout reading unit 190 that reads the image formed on a paper sheet.

As shown in FIG. 2, the image forming unit 150 is an electrophotographic image forming unit in which electrostatic latent images formed on electrically charged image carriers are developed and turned into toner images, and are transferred onto a paper sheet after the toner images in the respective colors are superimposed on one another on an intermediate transfer member. However, the specific structure of the image forming unit 150 is not necessarily the same as that shown in FIG. 2.

The printout reading unit 190 is designed to read an image formed on a paper sheet. The printout reading unit 190 is disposed on the downstream side of the image forming unit 150 and the fixing unit 160, to read the image while the paper sheet is being conveyed. Alternatively, the printout reading unit 190 may be disposed in an intermediate processing device (not shown) and a post-processing device (not shown) connected to the latter stage of the image forming apparatus 100.

[Control on and Settings in the Components of the Image Forming Apparatus]

The color materials to be used for image formation in the image forming unit 150 are cyan C, magenta M, yellow Y, and black K. In this embodiment, a color tone means the system of colors distinguished by color lightnesses and saturations. It should be noted that, in the description below, L*a*b* will be written simply as "Lab".

The printer controller 110 forms a raster image processing unit that converts original image data of an image other than a raster image into image data for forming a raster image.

The monitor setting unit 115 sets one or more monitor setting colors that include at least one of the following colors: a primary color (C, M, Y, or K) that is one of the color materials C, M, Y, and K to be used in image formation; a secondary color (R, G, or B) that is a combination of two of the primary colors; a tertiary color (flesh color or the like) generated by combining the three chromatic colors (C, M, and Y) among the primary colors at a predetermined ratio; and a tertiary achromatic color (gray) generated by combining the three chromatic colors among the primary colors at a predetermined ratio.

The tertiary color such as flesh color is not necessarily the skin color of a certain race, but may be any skin color in images taken in the country or the region where the apparatus is used.

The monitor setting unit 115 refers to the original image data, to set the monitor setting color and an ideal value for the monitor setting color for monitoring the color tone difference at the corresponding positions in the image data for image formation and the read image data. The monitor setting unit 115 also refers to the original image data, to set the monitor setting color in a low-spatial-frequency region that does not include text data. Here, the low-spatial-frequency region means a region in the image that does not include any contour or pattern and is in a certain color. A specific spatial frequency for such region can be determined by the manufacturer of the image forming apparatus or the user.

The monitor setting unit 115 can also set different colors as monitor setting colors. Further, the monitor setting unit 115 sets an ideal value for the monitor setting color by converting the original image data in accordance with the ICC profile or a multi-dimensional LUT. In accordance with the setting state of the monitor setting color, the monitor setting unit 115 also sets a loose threshold value or a strict threshold value depending on whether the monitor setting color has a loose setting or a strict setting. The monitor setting unit 115 also sets a suitable threshold value in accordance with the type of the monitor setting color. The monitor setting unit 115 also uses the mean value of colors extracted from more than one portion in the image, to set the monitor setting color.

The monitor setting unit 115 can also set an ideal value not in accordance with the original image data, but in accordance with read image data or the mean value of pieces of the read image data obtained by reading an image formed on a paper sheet in accordance with the image data for image formation. The color tone monitoring unit 180 monitors the color tone difference between the value of the read image data in the monitor setting color and the ideal value at the corresponding positions in the image data for image formation and the read image data with respect to the monitor setting color. The color tone monitoring unit 180 also monitors the color tone difference, using a threshold value that is the absolute value of the color tone difference caused by temporal change, and/or the degree of change in the color tone difference.

In a case where a tertiary achromatic color is selected as the monitor setting color, the color tone monitoring unit 180 monitors changes in hue as the color tone difference. In a case where a tertiary color is selected as the monitor setting color, the color tone monitoring unit 180 determines the tertiary color to be the color in the facial region recognized through a face recognition process, and monitors changes in the saturation of the tertiary color as the color tone difference. In this case, the image processing unit 140 performs image processing such as the face recognition process.

The color tone monitoring unit 180 monitors the color tone difference with respect to one setting in the monitor setting color at one corresponding position in the read image data.

In a case where a spot color other than the colors of the basic color materials to be used in image formation is selected as the monitor setting color, the color tone monitoring unit 180 monitors the color tone difference with respect to the spot color in a region that includes only the spot color and does not include any other color. When the color tone difference monitored by the color tone monitoring unit 180 is equal to or larger than a predetermined threshold value, the control unit 101 performs control so that color correction is performed in the image forming unit 150.

The control unit 101 performs color correction by adjusting the image forming unit 150, using read correction image data obtained by reading a correction image formed in the margin of a paper sheet. Even in a case where the color tone difference does not reach the threshold value, the control unit 101 performs color correction in the image forming unit 150 at regular time intervals or every time image formation is completed on a certain number of paper sheets. Furthermore, even in a case where the monitor setting color does not appear, the control unit 101 performs color correction in the image forming unit 150 at regular time intervals or every time image formation is completed on a certain number of paper sheets.

[Operation]

Figure 3:
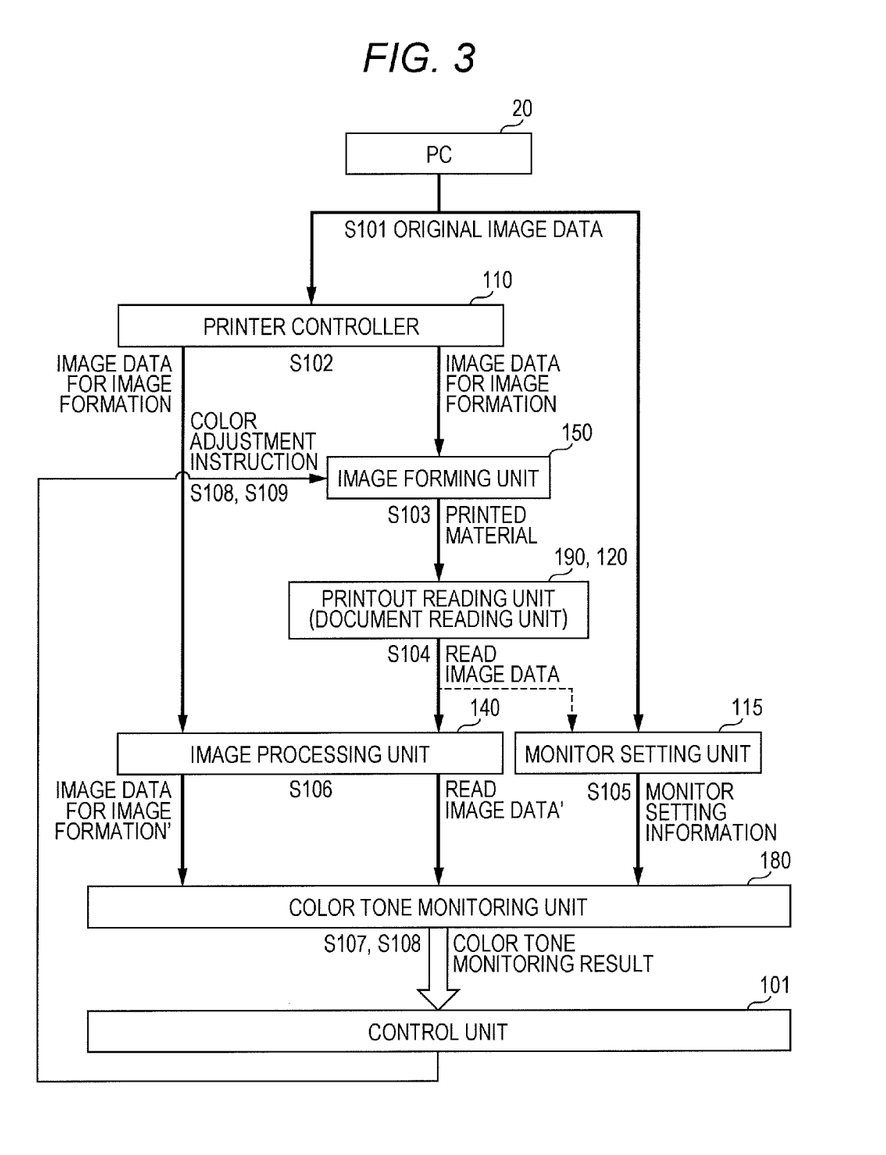
FIG. 3 is a diagram showing processing blocks for explaining the embodiment of the present invention.
Figure 4:
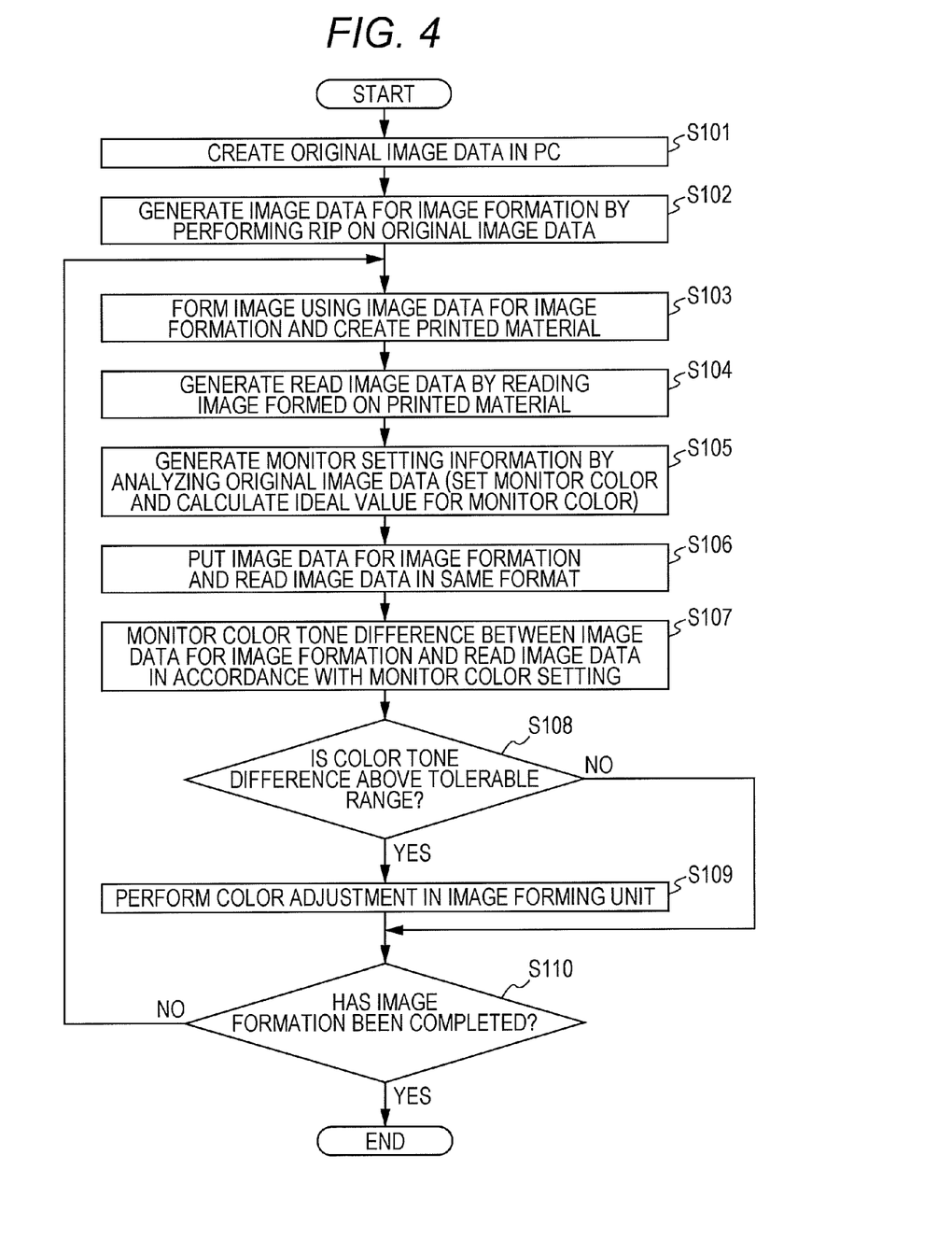
FIG. 4 is a flowchart showing operation according to the embodiment of the present invention.

An operation of the image forming apparatus of this embodiment is now described, with reference to the accompanying drawings. FIG. 3 is a processing block diagram showing the flow of data at a time when color tone monitoring according to this embodiment is performed. FIG. 4 is a flowchart showing the color tone monitoring according to this embodiment.

In the PC 20, the original image data (print data of an image other than a raster image) written in PDL is created by a user (step S101 in FIGS. 3 and 4). The original image data in the PDL format is supplied to the image forming apparatus via the network 30.

The user operates the operation display unit 103, to instruct the printer controller 110 to form an image from the original image data. Receiving this instruction from the user, the printer controller 110 performs RIP on the pre-RIP original image data written in the page-description language, to generate the image data (the image data for image formation) for forming an image in the image forming unit 150 (step S102 in FIGS. 3 and 4). The printer controller 110 then stores the image data for image formation into the image data storage unit 130, and supplies the image data to the image processing unit 140 and the image forming unit 150 as necessary.

The image forming unit 150 performs image formation using the image data for image formation supplied from the printer controller 110, to form an image on a paper sheet and output the printed material (step S103 in FIGS. 3 and 4). In this embodiment, a paper sheet having an image formed thereon by the image forming unit 150 is referred to as a "printed material". The printed material is read by the printout reading unit 190 or the document reading unit 120, so that read image data is generated (step S104 in FIGS. 3 and 4). The printout reading unit 190 or the document reading unit 120 temporarily stores the read image data generated by reading the printed material into the image data storage unit 130, and supplies the read image data to the image processing unit 140 or the like as necessary.

The monitor setting unit 115 refers to the original image data, to set the monitor setting color and an ideal value for the monitor setting color for monitoring the color tone difference at the corresponding positions in the image data for image formation and the read image data (step S105 in FIGS. 3 and 4).

In this step, the monitor setting unit 115 refers to the input original image data, to set one or more monitor setting colors that include at least one of the following colors: a primary color (C, M, Y, or K) that is one of the color materials C, M, Y, and K to be used in image formation; a secondary color (R, G, or B) that is a combination of two of the primary colors; a tertiary color (flesh color or the like (hereinafter referred to as the specific tertiary color)) generated by combining the three chromatic colors (C, M, and Y) among the primary colors at a predetermined ratio; and a tertiary achromatic color (gray) that is an achromatic color generated by combining the three chromatic colors among the primary colors at a predetermined ratio.

A tertiary achromatic color is sensitive to changes in hue (chromaticity). When the tertiary achromatic color changes, it is easy to determine which one of the colors CMY has changed. That is, monitoring the color tone difference in the tertiary achromatic color facilitates grasping changes in CMY, and enables feedback to CMY correction in the image forming unit 150. The primary colors (CMY or CMYK) and the secondary colors (RGB) are useful for monitoring of the maximum density portion. The specific tertiary color such as flesh color is sensitive to changes in hue and saturation, and accordingly, it is easy to check changes in hue and saturation.

The ideal value for the determined monitor setting color is set according to one of the following three methods. According to a first method, the monitor setting color (CMYK) is converted in accordance with the ICC profile or a multi-dimensional LUT, and the converted value is set as an ideal value of Lab or RGB. According to a second method, the actual measured value (the read image data: RGB) of the first printed material in which the monitor setting color appears is set as the ideal value. According to a third method, the mean value of the actual measured values (read image data: RGB) of the first few printed materials in which the monitor setting color appears is set as the ideal value.

To reduce the influence of errors, the monitor setting unit 115 refers to the original image data, to set the monitor setting color in a low-spatial-frequency region that does not include text data.

The monitor setting unit 115 can also set the ideal value not in accordance with the original image data (as indicated by a solid line in FIG. 3), but in accordance with the read image data or the mean value of pieces of the read image data obtained by reading an image formed on a paper sheet in accordance with the image data for image formation (as indicated by a dashed line in FIG. 3).

It is also possible to set different colors as monitor setting colors. Furthermore, the original image data is converted in accordance with the ICC profile or a multi-dimensional LUT, so that an ideal value for the monitor setting color is set. Furthermore, in accordance with the setting state of the monitor setting color, a loose threshold value or a strict threshold value is set depending on whether the monitor setting color has a loose setting or a strict setting. Alternatively, a suitable threshold value may be set in accordance with the type of the monitor setting color. Furthermore, the monitor setting color may be set with the use of the mean value of colors extracted from more than one portion in the image.

At this stage, the image processing unit 140 converts the image data for image formation and the read image data into data in a uniform format so that the image data for image formation and the read image data can be compared with each other (step S106 in FIGS. 3 and 4). The image data for image formation is CMYK bitmap data, and the read image data is RGB bitmap data. Therefore, the image data for image formation and the read image data cannot be compared with each other as they are. In view of this, the image processing unit 140 performs image processing so that the image data for image formation and the read image data are turned into data in the same data format, such as RGB bitmap data or Lab data. In FIG. 3, "image data for image formation" and "read image data" indicate that the two sets of data are in the same data format.

The color tone monitoring unit 180 monitors the color tone difference between the value of the read image data in the monitor setting color and the ideal value at the corresponding positions in the image data for image formation and the read image data with respect to the monitor setting color (step S107 in FIGS. 3 and 4).

That is, the color tone monitoring unit 180 first extracts the pixels in the region belonging to the monitor setting color set by referring to the image data for image formation and the read image data. More specifically, when the target pixel in the image data for image formation satisfies the conditions for setting the monitor setting color, the target pixel is extracted from the image data for image formation, and the pixel located in the same position of the target pixel in the read image data is extracted as the corresponding pixel. The corresponding pixel in the read image data is then compared with the ideal value for the monitor setting color, and the color tone difference between the two is extracted.

As for the timing to monitor the color tone difference, the color tone difference between the extracted read image data (the actual measured value) in the monitor setting color and the ideal value for the monitor setting color is calculated when the analysis of the image of one page is completed. In a case where the ideal value has been set as an RGB value, the difference between this RGB value and the RGB value of the read image data obtained from a scanned image is calculated. If the difference is equal to or larger than the threshold value, color correction is performed. In a case where the ideal value has been set as a Lab value, the RGB value of the read image data obtained from a scanned image is converted into a Lab value in accordance with the scanner profile or a multi-dimensional LUT, and the converted value is compared with the ideal value. If the difference is equal to or larger than the threshold value, color correction is performed.

It should be noted that the color tone monitoring unit 180 monitors the color tone difference, using a threshold value that is the absolute value of the color tone difference caused by temporal change, and/or the degree of change in the color tone difference. In a case where a tertiary achromatic color is selected as the monitor setting color, the color tone monitoring unit 180 monitors changes in hue as the color tone difference. In a case where a specific tertiary color such as flesh color is selected as the monitor setting color, the color tone monitoring unit 180 determines the specific tertiary color to be the color in the facial region recognized through a face recognition process, and monitors changes in the hue and the saturation of the specific tertiary color as the color tone difference. At this stage, the image processing unit 140 performs image processing such as the face recognition process, to extract the above mentioned target pixel and the corresponding pixel. The color tone monitoring unit 180 monitors the color tone difference with respect to one setting in the monitor setting color at one corresponding position in the read image data. In a case where a spot color other than the colors of the basic color materials to be used in image formation is selected as the monitor setting color, the color tone monitoring unit 180 monitors the color tone difference with respect to the spot color in a region that includes only the spot color and does not include any other color.

Specific examples of color tone monitoring are described below. In the description below, absolute color tone monitoring and relative color tone monitoring are explained.

[Specific Example of Absolute Color Tone Monitoring]
Image data for image formation (CMYK)→profile→ideal values RGB
Image data for image formation (CMYK)→printed material reading→actual measured values RGB In this case, ideal values RGB are compared with actual measured values RGB, and the color tone difference is monitored. When the color tone difference becomes equal to or larger than a predetermined threshold value, the later described color correction is performed.

[Specific Example of Relative Color Tone Monitoring]
First sheet of a printed material:
image data for image formation #1 (CMYK)→printed material #1→printed material #1 reading (RGB)→ideal values Lab #1
nth sheet of the printed material (n=2, 3, 4, . . . ):
image data for image formation #n (CMYK)→printed material #n→printed material #n reading (RGB)→actual measured values Lab #n In this case, measured values #1 generated from actual measured values are set as reference values, and actual measured values Lab #n are compared with the ideal values Lab #1. In this manner, the color tone difference with respect to "n" is monitored. When the color tone difference becomes equal to or larger than a predetermined threshold value, the later described color correction is performed.

Figure 5:
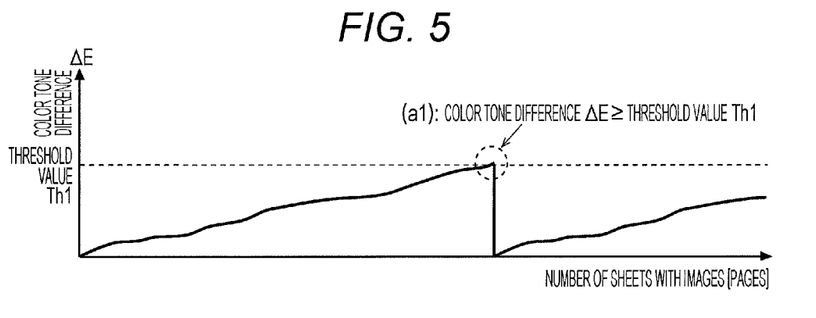
FIG. 5 is a graph for explaining a process according to the embodiment of the present invention.

In the color tone difference monitoring by the color tone monitoring unit 180, when the color tone difference (absolute value) $\Delta E$ simply becomes equal to or larger than a predetermined threshold value Th1, the result of the color tone monitoring is determined to be equal to or greater than the color tone difference threshold value. In FIG. 5, $\Delta E \geq Th1$ at the portion denoted by (a1).

Figure 6:
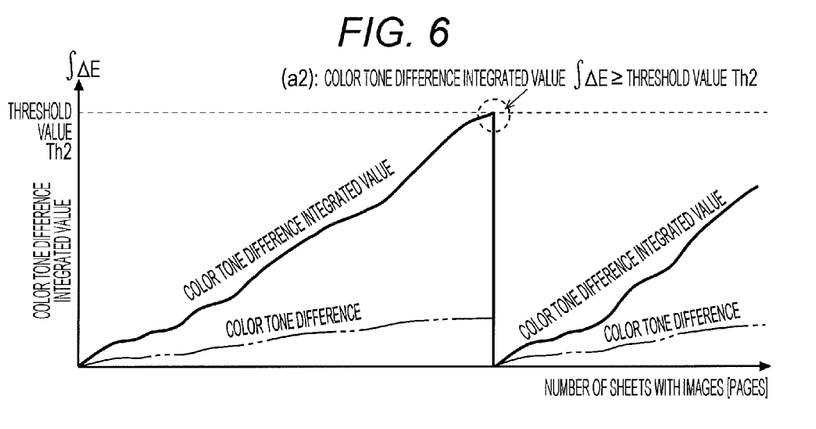
FIG. 6 is a graph for explaining a process according to the embodiment of the present invention.

Furthermore, in the color tone difference monitoring by the color tone monitoring unit 180, the result of the color tone monitoring is determined to be equal to or greater than the color tone difference threshold value when the color tone difference integrated value $\int \Delta E$ becomes equal to or greater than a predetermined threshold value Th2 as a result of sampling integration of the color tone difference (absolute value) $\Delta E$ caused by temporal change. In FIG. 6, $\Delta E \geq Th2$ at the portion denoted by (a2). In this case, even if the color tone difference $\Delta E$ has not reached the above mentioned threshold value Th1, the necessity to perform color correction can be determined in accordance with the color tone difference integrated value $\int \Delta E$, as long as a certain color tone difference lasts over a certain period of time.

Figure 7:
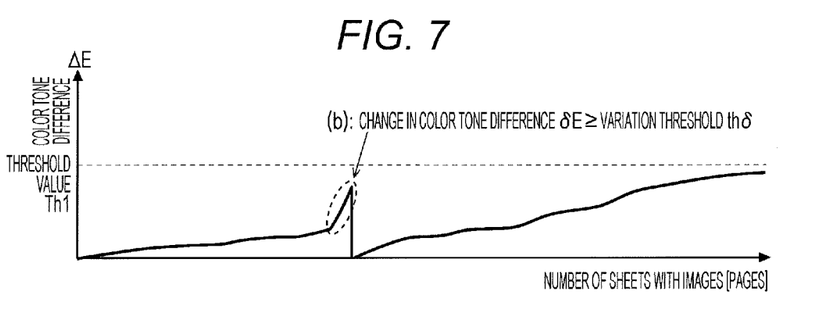
FIG. 7 is a graph for explaining a process according to the embodiment of the present invention.

Furthermore, in the color tone difference monitoring by the color tone monitoring unit 180, the degree of sudden change in the color tone difference, or the color tone difference in each paper sheet of a printed material, is monitored. When the color tone difference (relative value) $\delta E$ in each paper sheet becomes equal to or larger than a predetermined variation threshold value th$\delta$, the result of the color tone monitoring is determined to be equal to or greater than the color tone difference threshold value. In FIG. 7, at the portion denoted by (b), the color tone difference (absolute value) $\Delta E < Th1$, but the color tone difference (relative value) $\delta E \geq th\delta$.

That is, there are three different cases where "the color tone difference becomes equal to or larger than a predetermined threshold value", as described above. Furthermore, the color tone difference monitoring may involve one of the following kinds of monitoring: simple temporal color tone difference monitoring, temporal color tone difference integral monitoring, and sudden color tone difference monitoring. However, the color tone difference monitoring preferably involve at least two of these kinds of monitoring. In a case where two or more kinds of monitoring are performed, even when only one of the results of the monitoring is determined to be equal to or greater than a threshold value, color correction is preferably performed.

If the color tone difference monitored by the color tone monitoring unit 180 is equal to or larger than the predetermined threshold value (YES in S108 in FIG. 3 and step S108 in FIG. 4), the control unit 101 performs control so that color correction is performed in the image forming unit 150 (step S109 in FIGS. 3 and 4). That is, the control unit 101 performs color correction by adjusting the image forming unit 150, using read correction image data obtained by reading a correction image formed in the margin of a paper sheet.

The control unit 101 then repeatedly carries out the above procedures as a job on the all the images formed on paper sheets (step S110 in FIG. 4). The above color tone monitoring process can be performed for each paper sheet or for every certain number of sheets. In the above described embodiment, there is no need to use a color patch or the like in color tone monitoring. Accordingly, even if the color tone monitoring is performed for each paper sheet having an image formed thereon, productivity will not be lowered.

[Another Operation (1)]

In image data for image formation obtained through RIP, a secondary color or a tertiary achromatic color that is completely isochromatic might be mixed at a certain rate through color management. To counter this, it is preferable to set such a threshold value as to allow color mixing in the monitor setting color without adversely affecting the color tone monitoring in processing of an actual product.

For example, in a case where a tertiary achromatic color (gray) is extracted as the monitor setting color, and the signal values of the respective colors of YMC are at the 256 levels of level 0 to level 255, the tertiary achromatic color is preferably extracted when the signal value differences among the respective signal values CMY are smaller than 3 as in a case where (C−M<±3), (M−Y<±3), and (Y−C<±3). In this case, the 256 levels of signal values and the signal value differences of 3 are merely examples, and any appropriate numerical values may be set as the number of signal value levels and the values of signal value differences. In a case where a certain amount of color mixing in the monitor setting color is allowed as above, a slightly loose threshold value is preferably set as the threshold value for the color tone difference in color tone monitoring, with the color mixing being taken into account.

The tertiary achromatic color (gray) in the above embodiment is not gray generated only from K. Therefore, gray generated from a mixture of CMY and K is also regarded as a tertiary achromatic color.

[Another Operation (2)]

Users use various kinds of images, and a desired color might not be extracted as a monitor setting color. In such a case, it is possible to collect data over a wider range by widening the threshold value (range) for extraction. However, if the threshold value range for extraction is widened in such a manner, the level of the threshold value with which a color tone difference is detected should preferably be lowered. Furthermore, where such measures are taken, it is preferable to notify the user via the operation display unit 103.

Specific Example (3) of the Embodiment

When color tone monitoring is performed on the monitor setting color in read image data, the target image in the read image data may be divided into M×N areas, and the mean value of the monitor setting color extracted from the respective areas may be calculated. The mean value is compared with an ideal value in the monitoring operation. In this manner, the color tone difference in the entire area of the printed matter can be monitored.

Specific Example (4) of the Embodiment

When color tone monitoring is performed on the monitor setting color in read image data, it is also preferable to divide the target image in the read image data into M×N areas, and perform color tone monitoring on the monitor setting color with respect to ideal values generated in the respective corresponding areas and the pixels of the read image data included in the same areas as the areas to which the ideal values belong. In this manner, it is possible to perform color tone monitoring after eliminating the influence of in-plane unevenness that would cause different densities at the center and the edges of the paper sheet.

Specific Example (5) of the Embodiment

Even in a case where the color tone difference does not reach the threshold value, the control unit 101 preferably performs color correction in the image forming unit 150 at regular time intervals or every time image formation is completed on a certain number of paper sheets. In a case where the monitor setting color is a primary color (CMYK), a secondary color (RGB), a specific tertiary color such as flesh color, or a tertiary achromatic color, and the color tone difference being monitored is equal to or smaller than the threshold value, the difference between actual measured data and the ideal value data is preferably fed back to gamma correction.

Specific Example (6) of the Embodiment

Even in a case where the monitor setting color does not appear over two or more consecutive paper sheets, the control unit 101 preferably performs color correction in the image forming unit 150 at regular intervals or every time image formation is completed on a certain number of paper sheets.

Specific Example (7) of the Embodiment

In a case where a spot color other than the colors of the basic color materials to be used in image formation is used, the color tone monitoring unit 180 may set this spot color as the monitor setting color. In a case where a spot color is set as the monitor setting color, it is preferable to monitor the color tone difference in a region that includes only the spot color and does not include any other color.

For example, if a fifth color to be used as the color of a color material in addition to CMYK for image formation is red (R), only the region that includes only red (R) and does not include CMYK is subjected to monitoring, so that changes in the fifth color can be monitored.

In a case where the fifth color is a transparent (clear) color, each region that includes the transparent color is excluded from the regions to be subjected to monitoring, even if some other monitor setting color is included in those regions. This is to eliminate the influence of the transparent color in the read image data.

Modification (1)

Although the image forming apparatus 100 shown in FIG. 1 includes the printer controller 110, the present invention is not limited to such a configuration. More specifically, the printer controller 110 may be located outside the image forming apparatus 100, and the image forming apparatus 100 may receive RIP-processed image data for image formation from outside.

Modification (2)

Although the printer controller 110 and the monitor setting unit 115 are separated from each other in the above described example of the image forming apparatus 100, the present invention is not limited to such a configuration. Since both the printer controller 110 and the monitor setting unit 115 refer to original image data, the printer controller 110 may include the monitor setting unit 115.

Modification (3)

The above described image forming apparatus 100 includes the color tone monitoring unit 180. However, a color tone monitoring device that includes the monitor setting unit 115 and the color tone monitoring unit 180 may be formed outside the image forming apparatus 100. In such a case, a result of monitoring performed by the color tone monitoring device is transmitted to the image forming apparatus 100, and the image forming apparatus 100 performs color correction.

According to an embodiment of the present invention, the effects described below can be achieved.

(1) In an image forming apparatus that reflects one aspect of the present invention, a monitor setting color for monitoring a color tone difference at corresponding positions in image data for image formation and read image data, and an ideal value for the monitor setting color are set. The monitor setting color is set so as to include at least one of the following colors: a primary color, a secondary color, a tertiary color, and a tertiary achromatic color among the color materials to be used in image formation. The color tone difference between the value of the read image data in the monitor setting color and the ideal value is monitored at the corresponding positions. When the color tone difference is equal to or larger than a predetermined threshold value, color correction is performed.

That is, the color tone difference between the value of the read image data and the ideal value is monitored with respect to a predetermined monitor setting color pixel by pixel. Thus, the color tone is not affected by a shortage of the data to be monitored or the like, and can be appropriately monitored without the use of a color patch or the like.

(2) In (1), the color tone difference is monitored, with the threshold value being the absolute value of the color tone difference caused by temporal change, and/or the degree of change in the color tone difference. Thus, the color tone is not affected by a shortage of the data to be monitored or the like, and can be appropriately monitored without the use of a color patch or the like.

(3) In (1) and (2), the monitor setting color is set in a low-spatial-frequency region that does not include text data. Thus, the color tone difference between the value of the read image data in the monitor setting color and the ideal value can be appropriately monitored pixel by pixel, and the color tone can be appropriately monitored without the use of a color patch or the like.

(4) In (1) through (3), a tertiary achromatic color is selected as the monitor setting color, and thus, the color tone can be appropriately monitored without the use of a color patch or the like.

(5) In (1) through (4), if a tertiary color is selected as the monitor setting color, a color in a facial region recognized through a face recognition process is determined to be the tertiary color. Thus, the color tone in a photographic image of a person or the like can be appropriately monitored without the use of a color patch or the like.

(6) In (1) through (5), different colors are set as the monitor setting colors, and thus, the color tone can be appropriately monitored over a wide range of colors.

(7) In (1) through (6), the original image data is converted in accordance with the ICC profile or a multi-dimensional LUT so that the ideal value for the monitor setting color is set. Thus, the color tone can be appropriately monitored in accordance with an absolute criterion.

(8) In (1) through (6), the ideal value is set in accordance with the read image data obtained by reading the image formed on the paper sheet in accordance with the image data for image formation, or the mean value of pieces of the read image data. Thus, the color tone can be appropriately monitored in accordance with the image formed from the image data for image formation, without the use of a color patch or the like.

(9) In (1) through (8), the threshold value is set in accordance with the setting state of the monitor setting color, and therefore, a loose threshold value or a strict threshold value is set depending on whether the setting of the monitor setting color is loose or strict. Thus, the color tone can be appropriately monitored in accordance with the setting of the monitor setting color, while the monitor setting color is effectively maintained.

(10) In (1) through (9), an appropriate threshold value is set in accordance with the type of the monitor setting color. Thus, the color tone can be appropriately monitored without the use of a color patch or the like.

(11) In (1) through (10), the monitor setting color is set with the use of the mean value of the color extracted from two or more portions in the image. Thus, the color tone can be appropriately monitored without the use of a color patch or the like.

(12) In (1) through (11), the color tone difference is monitored at a corresponding position in the read image data, with respect to one setting of the monitor setting color. Thus, the color tone can be appropriately monitored without the use of a color patch or the like (13) In (1) through (12), in a case where a spot color other than the colors of the basic color materials to be used for image formation is set as the monitor setting color, the color tone difference with respect to the spot color is monitored in a region that includes only the spot color and does not include any other color. Thus, the color tone with respect to the spot color is not affected by the color of any other color material, and can be appropriately monitored without the use of a color patch or the like.

(14) In (1) through (13), even in a case where the color tone difference does not reach the threshold value, control is performed so that color correction is performed in the image forming unit at certain time intervals or every time image formation is completed on a certain number of paper sheets. Thus, the color tone can be appropriately monitored.

(15) In (1) through (14), even in a case where the monitor setting color does not appear, control is performed so that color correction is performed in the image forming unit at certain time intervals or every time image formation is completed on a certain number of paper sheets. Thus, color correction can be performed while the color tone is appropriately monitored.

(16) In (1) through (15), a correction image is formed in the margin of the paper sheet, and the correction image is read so that read correction image data is generated. The image forming unit is adjusted in accordance with the read correction image data. Thus, color correction can be performed while the color tone is appropriately monitored.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising:
a raster image processing unit configured to convert original image data into image data for image formation, the original image data being of an image other than a raster image, the image data for image formation being of a raster image;
an image forming unit configured to form an image on a paper sheet in accordance with the image data for image formation;
a reading unit configured to generate read image data by reading the image formed on the paper sheet by the image forming unit;
a monitor setting unit configured to set a monitor setting color and an ideal value for the monitor setting color, the monitor setting color being used for monitoring a color tone difference at corresponding positions in the image data for image formation and the read image data;
a color tone monitoring unit configured to monitor a color tone difference between a value of the read image data in the monitor setting color and the ideal value at the corresponding positions in the image data for image formation and the read image data; and
a hardware processor configured to perform control to have color correction performed in the image forming unit when the color tone difference is equal to or larger than a predetermined threshold value in the color tone monitoring unit, wherein
the monitor setting color includes at least one of a primary color among primary colors of color materials to be used in image formation, a secondary color generated by combining two of the primary colors, a tertiary color generated by combining three chromatic colors among the primary colors at a predetermined ratio, and a tertiary achromatic color generated by combining three chromatic colors among the primary colors at a predetermined ratio.

2. The image forming apparatus according to claim 1, wherein
the color tone monitoring unit performs color tone difference monitoring, using at least one of an absolute value of the color tone difference caused by temporal change and a degree of change in the color tone difference as a threshold value.

3. The image forming apparatus according to claim 1, wherein
the monitor setting unit sets the monitor setting color in a low-spatial-frequency region not including text data.

4. The image forming apparatus according to claim 1, wherein
the monitor setting unit selects the tertiary achromatic color as the monitor setting color.

5. The image forming apparatus according to claim 1, wherein,
when the tertiary color is selected as the monitor setting color, the monitor setting unit determines the tertiary color to be a color in a facial region recognized through a face recognition process.

6. The image forming apparatus according to claim 1, wherein
the monitor setting unit sets a plurality of colors as the monitor setting colors.

7. The image forming apparatus according to claim 1, wherein
the monitor setting unit sets the ideal value by converting the original image data as the monitor setting color in accordance with one of an ICC profile and a multi-dimensional LUT.

8. The image forming apparatus according to claim 1, wherein
the monitor setting unit sets the ideal value in accordance with one of the read image data obtained by reading the image formed on the paper sheet by the image forming unit in accordance with the image data for image formation, and a mean value of a plurality of pieces of the read image data.

9. The image forming apparatus according to claim 1, wherein
the monitor setting unit sets the threshold value in accordance with a setting state of the monitor setting color.

10. The image forming apparatus according to claim 1, wherein
the monitor setting unit sets the threshold value in accordance with a type of the monitor setting color.

11. The image forming apparatus according to claim 1, wherein
the monitor setting unit sets the monitor setting color by using a mean value of color extracted from a plurality of portions in the image.

12. The image forming apparatus according to claim 1, wherein
the color tone monitoring unit monitors the color tone difference at a corresponding position in the read image data with respect to one setting of the monitor setting color.

13. The image forming apparatus according to claim 1, wherein,
when the monitor setting unit sets a spot color as the monitor setting color, the spot color being other than colors of basic color materials to be used in image formation,
the color tone monitoring unit monitors the color tone difference with respect to the spot color in a region including only the spot color, the region not including other colors.

14. The image forming apparatus according to claim 1, wherein,
even when the color tone difference does not reach the threshold value in the color tone monitoring unit, the hardware processor performs control to have color correction performed in the image forming unit at regular time intervals or every time image formation is completed on a certain number of paper sheets.

15. The image forming apparatus according to claim 1, wherein,
even when the monitor setting color does not appear, the hardware processor performs control to have color correction performed in the image forming unit at regular time intervals or every time image formation is completed on a certain number of paper sheets.

16. The image forming apparatus according to claim 1, wherein the hardware processor performs the color correction by:
forming a correction image in a margin of the paper sheet with the image forming unit;
generating read correction image data by reading the correction image with the reading unit; and
adjusting the image forming unit by using the read correction image data with the hardware processor.

17. A non-transitory recording medium storing a computer readable program for causing a computer to execute:

a raster image processing step of converting original image data into image data for image formation, the original image data being of an image other than a raster image, the image data for image formation being of a raster image;

an image forming step of forming an image on a paper sheet in accordance with the image data for image formation;

a reading step of generating read image data by reading the image formed on the paper sheet in the image forming step;

a monitor setting step of setting a monitor setting color and an ideal value for the monitor setting color, the monitor setting color being used for monitoring a color tone difference at corresponding positions in the image data for image formation and the read image data;

a color tone monitoring step of monitoring a color tone difference between a value of the read image data in the monitor setting color and the ideal value at the corresponding positions in the image data for image formation and the read image data; and a step of performing color correction in the formed image when the color tone difference is equal to or larger than a predetermined threshold value in the color tone monitoring step, wherein the monitor setting color includes at least one of a primary color among primary colors of color materials to be used in image formation, a secondary color generated by combining two of the primary colors, a tertiary color generated by combining three chromatic colors among the primary colors at a predetermined ratio, and a tertiary achromatic color generated by combining three chromatic colors among the primary colors at a predetermined ratio.

* * * * *